Aug. 11, 1964  A. E. BUCHHOLZ ETAL  3,143,749
RETRACTABLE WHEEL INSTALLATION AND ACTUATING
MECHANISM THEREFOR
Filed April 4, 1962  2 Sheets-Sheet 1

INVENTORS.
ALBERT E. BUCHHOLZ
BY KENNETH E. CLAUSEN

Wheeler, Wheeler & Wheeler
ATTORNEYS.

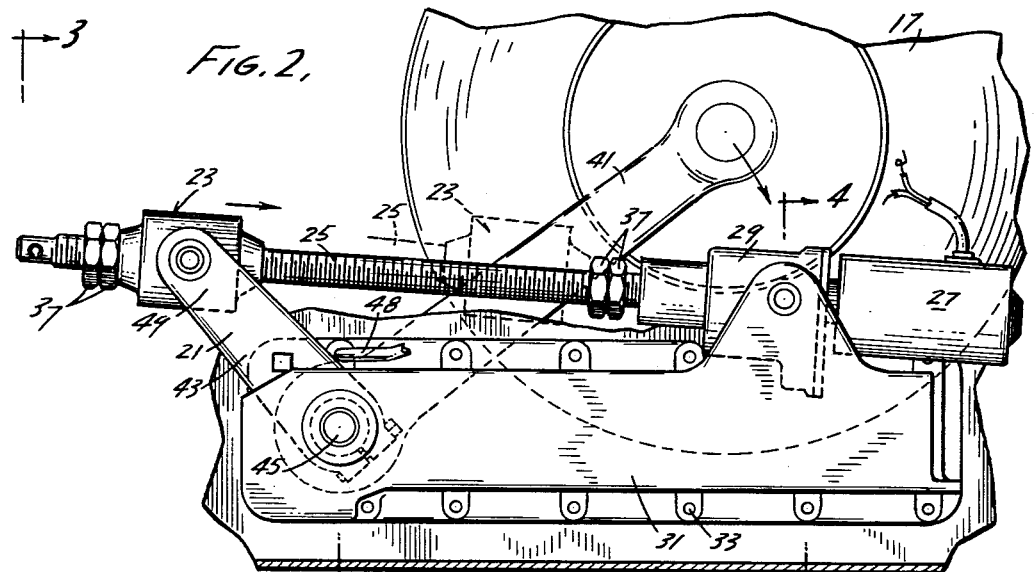
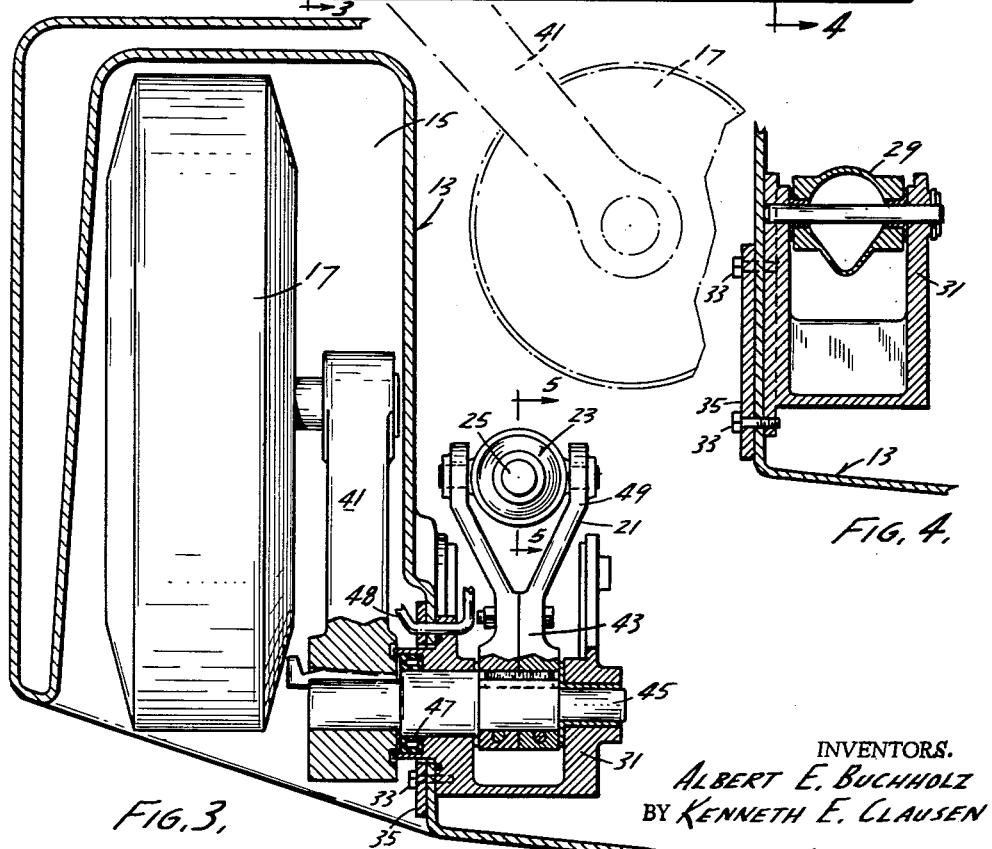

3,143,749
RETRACTABLE WHEEL INSTALLATION AND ACTUATING MECHANISM THEREFOR
Albert E. Buchholz, deceased, late of Kenosha, Wis., by Robert K. Gerling, special administrator, Des Plaines, Ill., and Kenneth E. Clausen, Waukegan, Ill., assignors to Outboard Marine Corporation, Waukegan, Ill., a corporation of Delaware
Filed Apr. 4, 1962, Ser. No. 185,166
14 Claims. (Cl. 9—1)

The invention relates generally to boats, or other vehicles, including one or more wheels which are shiftable between a ground-engaging, load-supporting position and a retracted position. The invention also generally relates to actuating mechanisms for shifting an associated member or device from one position to another and for retaining the member or device in any selected position under load. More specifically, the invention relates to actuating mechanisms for positioning wheels relative to the hull of a boat.

The invention contemplates an actuating mechanism including a linearly displaceable member and an actuated link, which mechanism is operable to effect movement of the actuated link through a predetermined path, to sustain the actuated link in any given position, and to absorb shock loads which would otherwise be transmitted through the mechanism. In the specifically disclosed embodiment, the linearly displaceable member is a nut which is axially movable along a lead screw and the actuated link is a bell crank lever carrying a wheel. The linearly displaceable member is coupled to the link by a resilient connection affording relative movement of the member and the link and the absorption of shock loads transmitted thereto, as for instance, from the wheel incident to travel over the ground.

The resilient connection between the nut and the part actuated thereby not only absorbs shocks incident to the operation of the nut, but also serves as a cushion to absorb road shock, making it possible to dispense with other springing. This is an unusual feature in a structure in which the cushioning is effective in all operative positions of the wheel respecting the supported body.

The principal objects of the invention are the provision of an improved actuating mechanism and the provision of a boat, or other vehicle, including a wheel which can be located in either of an operable ground-engaging position and a retracted position by said improved actuating mechanism. Other objects and advantages of the invention will become known by reference to the following description and the accompanying drawings, in which:

FIGURE 2 is an enlarged, fragmentary sectional view taken generally along line 2—2 of FIGURE 1 with the wheel shown in its retracted position;

FIGURE 3 is a further enlarged, fragmentary sectional view taken generally along line 3—3 of FIGURE 2;

FIGURE 4 is a fragmentary, sectional view taken generally along line 4—4 of FIGURE 2;

Figure 1:
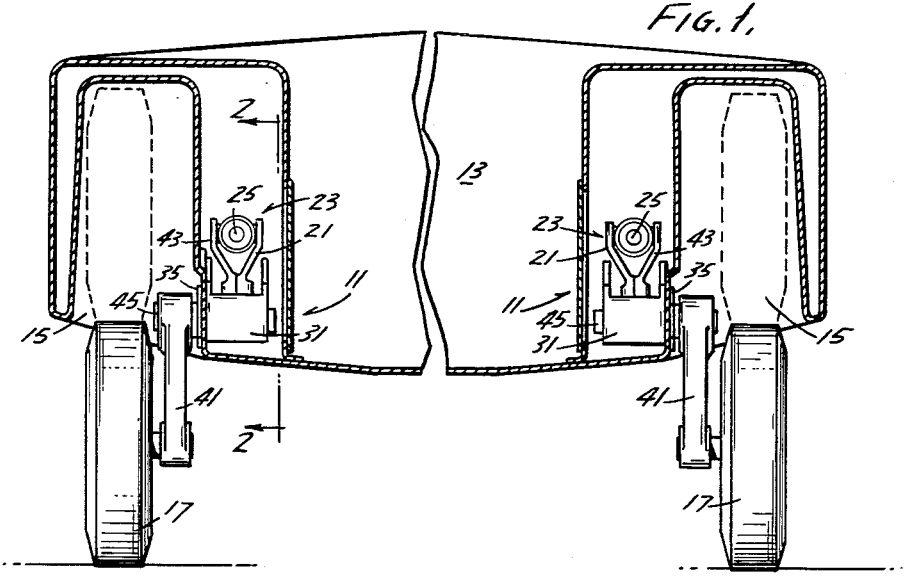
FIGURE 1 is a transverse sectional view of a boat hull incorporating a retractable wheel installation embodying various of the features of the invention.

Actuating mechanisms 11, in accordance with the invention, are shown in the drawings installed in a boat hull 13 provided on the underside with a pair of spaced wells or recesses 15 and a pair of wheels 17 which are retractable into the recesses 15 from ground-engaging, boat-supporting positions in extending relation to the boat hull 13.

The actuating mechanisms 11 are identical and serve to afford selective positioning of the wheels 17, to sustain the wheels 17 in any given position, and to absorb shock loads. While the preferred embodiment of the invention shows the actuating mechanisms 11 in combination with the boat hull 13 and the wheels 17, the actuating mechanisms 11 have wide utility apart from the disclosed combination and can be advantageously employed for positioning a member or device, particularly when shock loads are commonly encountered, either during positioning of the member or device or when the member or device is located in a preselected position.

The actuating mechanisms 11 each include a linearly displaceable member which, in the disclosed construction, takes the form of a nut 19 (see FIGURE 5) and a link or lever 21 which is connected by a coupling 23 to the nut 19 and is mounted for movement in accordance with linear movement of the nut. In the specifically disclosed construction, the nut 19 is threadedly engaged on a lead screw 25, which screw incorporates an acme thread to prevent feed-back rotation of the screw by reason of loads imposed upon the nut. The lead screw 25 can be manually operated, but, in the disclosed construction, is powered by a reversible electric motor 27. More specifically, as seen in FIGURE 2, the motor 27 drives the lead screw 25 through a speed reducer 29 which additionally serves to support the motor 27 and the lead screw 25 and which is pivotally mounted on a generally U-shaped frame 31. In turn, the U-shaped frame 31 is suitably attached to the inside of the hull 13, as by bolts 33 passing through the hull and connecting with an exterior mounting plate 35.

Adjustably carried on the lead screw 25 are two pairs of lock nuts 37 which serve to limit movement of the nut 19. Microswitches (not shown) can be mounted on the lock nuts to prevent over-running of the motor 27.

The actuating lever 21, in the disclosed construction, takes the form of a composite bell crank lever having arms 41 and 43 which are laterally spaced by an arbor or shaft 45 which is pivotally supported in the legs of the U-shaped frame 31 and which extends through the boat hull 13. In this connection, as seen best in FIGURE 3, the arm 41 is located exteriorally of the hull for pivotal movement into and out of one of the well recesses 15, and rotatably carries one of the wheels 17 at its outer end. A packing 47 around the arbor 45 prevents entry of water into the hull 13. In addition, as the disclosed construction contemplates brake mechanisms in association with the wheels 17, provision is made for passing a flexible brake fluid conduit 48 through the hull 13 in the area adjacent to the pivotal mounting of the actuating lever 21.

The other arm 43 of the actuating lever 21 is disposed within the hull 13 and has a bifurcated end 49 including suitable means providing a trunnion-type pivoted connection with the coupling 23 joining the actuating lever 21 to the nut 19.

Figure 5:
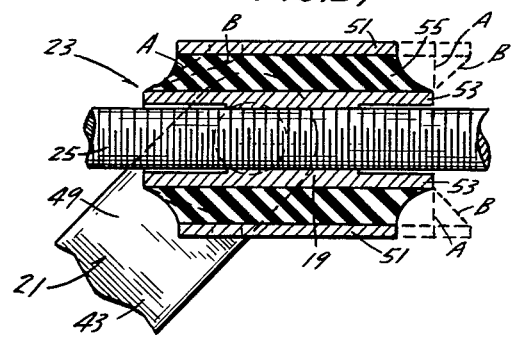
FIGURE 5 is an enlarged, sectional view taken generally along line 5—5 of FIGURE 3.

The coupling 23, as seen best in FIGURE 5, comprises an outer member or cylindrical sleeve 51 and an inner member or cylindrical sleeve 53 which constitutes an extended outer surface of the nut 19, together with a cylindrical member or shoe 55 of resilient material, such as rubber, which is bonded, as by vulcanizing, to each of the sleeves 51 and 53.

The rubber member 55 serves in co-operation with the actuating lever 21 to prevent rotation of the nut 19 incident to rotation of the lead screw 25. In addition, the rubber member 55 serves to effect displacement of the outer sleeve 51 axially of the lead screw 25 in response to axial movement of the inner sleeve 53 accompanying movement of the nut 19 along the lead screw 25.

At the same time, the rubber member 55 affords limited torsional and linear displacement of the outer and inner sleeves 51 and 53 relative to each other. Thus, the rubber member 55 affords absorption of torsional shock loads, as for instance, incident to starting or stopping of the motor, and of shock loads transmitted axially of the lead screw, as for example, loads transmitted from the wheels 17 during travel over the ground.

The dotted configuration of the coupling 23, indicated by the letter "A" in FIGURE 5, shows one position of the sleeves relative to each other when under a given static load, and the dotted configuration, indicated by the letter "B," shows the disposition of the sleeves when under the given static load plus a given dynamic load.

Figure 6:
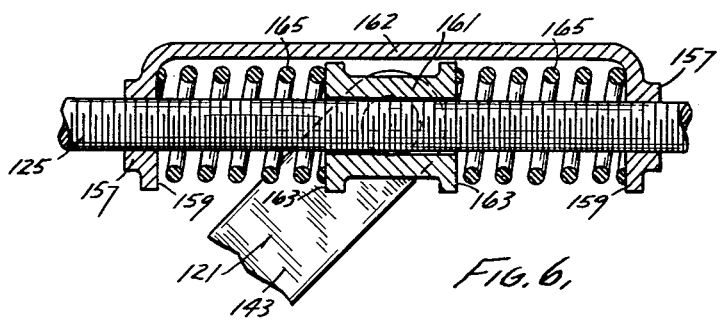
FIGURE 6 is a sectional view of a modified coupling arrangement embodying various of the features of the invention.

Other forms of resilient means can be employed to obtain shock absorption capacity at the coupling connecting the nut 19 and the actuating lever 21. One such other form is shown in FIGURE 6 and includes a nut 157 which is elongated to provide two spaced surfaces 159 disposed transversely of the lead screw 125. Pivotally carried at the outer end of the arm 143 of the actuating lever 121 is a hub or sleeve member 161 which is freely movable axially of the lead screw and which may be proportioned for co-operation with a co-operatively formed central portion 162 of the nut 157 to prevent relative rotation therebetween, thereby assuring axial displacement of the nut in response to rotation of the lead screw. The opposed ends 163 of the hub 161 constitute spring seats which are resiliently spaced from the opposed surfaces or spring seats 159 of the nut 157 by respective coil springs 165, thereby affording absorption between the nut 157 and the hub 161 of shock loads transmitted axially of the lead screw 125. If the nut is restrained from rotation by means on the supporting frame then the arrangement also effectively insulates the actuating lever from any torsional shock load. However, if the hub and central part 162 of the elongated nut 157 have engaged portions preventing relative rotation therebetween, this advantage is not obtained.

Still other arrangements can be employed. For instance, a single coil spring 165 disposed with its axis parallel to the lead screw 125 can be employed, provided that the coil spring is anchored at its ends to one of the nut surfaces 159 and to one of the hub ends 163. In addition, while the disclosed arrangement includes pivotal mounting of the speed reducer 29 on the U-shaped frame 31 to accommodate rocking of the actuating lever 21 about the axis of the arbor 45, the lead screw 25 could be fixed against pivotal movement, provided that there is incorporated a suitable connection between the nut 19 and lever 21 affording lost motion radially of the rotational axis of the lever 21.

Various of the features of the invention are set forth in the following claims.

What is claimed is:

1. In a boat including a hull, a wheel, means mounting said wheel on said hull for selective disposition of said wheel in a first position in generally extending relation to said hull and in a second position in relatively less extending relation to said hull, the improvement comprising
    a bell crank lever pivotally mounted on said hull, said lever having one end including means rotatably supporting said wheel,
    a movable element,
    means mounting said element on said hull for linear movement, and
    resilient means connecting said element and the other end of said bell crank lever for actuating pivotal movement of said bell crank lever to selectively locate said wheel in said first and second positions, and for absorption of shock loads, said connecting means being resilient in a direction along the path of linear movement of said element.

2. The improvement set forth in claim 1 wherein said element comprises a nut,
    said element mounting means comprises
        a screw threadedly engaged with said nut, and
        means for preventing rotation of said nut with said screw, and
    said resilient connecting means connects said nut and said other end of said bell crank lever.

3. An improvement as set forth in claim 2 including electric power means, and
    means drivingly connecting said power means and said screw for rotation of the latter.

4. An improvement as set forth in claim 2 wherein said resilient connecting means includes
    a member pivotally mounted on said bell crank lever in spaced relation to said nut, and
    an intermediate member of resilient material secured to said nut and to said pivotally mounted member.

5. The improvement set forth in claim 4 wherein
    said nut includes an outer cylindrical surface with an axis coinciding with the axis of said screw,
    said pivotally mounted member comprises a cylindrical sleeve concentric with said outer surface, and
    said intermediate member is fabricated in cylindrical form from a material selected from a group consisting of rubber and rubber-like materials and is bonded to said outer surface and to said sleeve.

6. An improvement as set forth in claim 2 wherein said resilient connecting means includes
    a surface on said nut disposed transversely of said screw, and
    spring means connecting said transverse surface and said other end of said lever for resiliently imparting movement axially of said screw to said other end of said lever in response to rotation of said screw.

7. An improvement as set forth in claim 2 wherein said resilient means includes
    two spaced surfaces on said nut disposed transversely of said screw,
    a member pivotally connected to said other end of said lever, disposed between said two spaced surfaces, and carried axially of said screw, and
    spring means confined between each of said transverse surfaces and the adjacent end of said member for resisting movement of said member relative to said spaced surfaces in directions axially of said screw.

8. In a link actuating mechanism comprising a movable element selectively displaceable along a linear path, a link, means guiding said link for movement along a predetermined arcuate path, and means for connecting said link at a point spaced from said guiding means to said element, whereby movement of said link along said predetermined path and linear displacement of said element are related, the improvement comprising
    the incorporation in said connecting means of means affording resilient relative movement of between said link and said element along the linear path of said element, thereby to absorb shock loads transmitted in the direction of the linear path of said element to said connecting means.

9. The improvement set forth in claim 8 wherein said element is a nut threadedly engaged on a rotatable screw for axial travel incident to rotation of the screw.

10. The improvement set forth in claim 9 wherein said means affording resilient relative movement includes
    a member pivotally mounted on said link in spaced relation to said nut, and
    an intermediate member of resilient material secured to said nut and to said pivotally mounted member.

11. The improvement as set forth in claim 9 wherein said means affording resilient relative movement includes
    a surface on said nut disposed transversely of said screw, and
    spring means connecting said transverse surface and said link for resiliently imparting movement axially of the screw to said link in response to rotation of the screw.

12. An improvement as set forth in claim 9 wherein said means affording resilient relative movement includes
two spaced surfaces on said nut disposed transversely
of the path of linear movement,
a member pivotally connected to said link so as to afford movement thereof along the linear path of said nut and disposed between said two spaced surfaces, and
spring means confined between each of said transverse surfaces and the adjacent end of said member for resisting movement of said member relative to said spaced surfaces in directions along said linear path.

13. In a link actuating mechanism comprising a movable element selectively displaceable along a linear path, a link, means mounting said link for pivotal movement about an axis transverse to the direction of the path of said element, and means for connecting said link at a point spaced from said mounting means to said element, whereby pivotable movement of said link and linear displacement of said element are related, the improvement comprising
the incorporation in said connecting means of means affording resilient movement of said link relative to said element in a direction along the path of said element, thereby to absorb shock loads transmitted in the direction of the path of said element to said connecting means.

14. The combination of a screw, means for rotating said screw, a nut threaded on the screw and including a seat for a spring, means for preventing rotation of said nut with said screw whereby said nut is displaced axially of said screw in response to rotation thereof, a nut actuated member including a seat for a spring, and a spring interposed between said spring seats on said nut and said member.

References Cited in the file of this patent

UNITED STATES PATENTS

| | | |
|---|---|---|
| 1,456,740 | Link | May 29, 1923 |
| 1,847,693 | Kindervater | Mar. 1, 1932 |
| 2,203,290 | Best | June 4, 1940 |
| 2,532,344 | Smith | Dec. 5, 1950 |
| 2,715,041 | Fierbaugh | Aug. 9, 1955 |
| 2,893,019 | Renfroe | July 7, 1959 |

FOREIGN PATENTS

| | | |
|---|---|---|
| 489,840 | Italy | Jan. 29, 1954 |

UNITED STATES PATENT OFFICE
CERTIFICATE OF CORRECTION

Patent No. 3,143,749                                              August 11, 1964

Albert E. Buchholz, deceased, by Robert K. Gerling,
special administrator, et al.

It is hereby certified that error appears in the above numbered patent requiring correction and that the said Letters Patent should read as corrected below.

Column 4, line 52, strike out "of".

Signed and sealed this 24th day of November 1964.

(SEAL)
Attest:

ERNEST W. SWIDER                                      EDWARD J. BRENNER
Attesting Officer                                         Commissioner of Patents